US012580386B2

(12) United States Patent     (10) Patent No.:   US 12,580,386 B2
Jones et al.     (45) Date of Patent:    Mar. 17, 2026

(54) SYSTEMS AND METHODS FOR INTERVAL ENERGY DISAGGREGATION UTILIZING MACHINE LEARNING

(71) Applicant: Rainforest Automation, Inc., Vancouver (CA)

(72) Inventors: Richard Thomas Jones, Port Coquitlam (CA); Christopher Stanley James Tumpach, Vancouver (CA)

(73) Assignee: Rainforest Automation, Inc., Vancouver (CA)

( * ) Notice: Subject to any disclaimer, the term of this patent is extended or adjusted under 35 U.S.C. 154(b) by 380 days.

(21) Appl. No.: 18/324,032

(22) Filed: May 25, 2023

(65) Prior Publication Data

US 2024/0396332 A1     Nov. 28, 2024

(51) Int. Cl.
    *H02J 3/00*       (2006.01)
    *H02J 3/38*       (2006.01)

(52) U.S. Cl.
    CPC .............. *H02J 3/004* (2020.01); *H02J 3/003* (2020.01); *H02J 3/381* (2013.01); *H02J 2203/20* (2020.01); *H02J 2300/24* (2020.01)

(58) Field of Classification Search
    CPC .. H02J 3/004; H02J 3/003; H02J 3/381; H02J 2203/20; H02J 2300/24
    See application file for complete search history.

(56) References Cited

U.S. PATENT DOCUMENTS

| | | | |
|---|---|---|---|
| 11,404,998 B1 * | 8/2022 | Shareef .................... | G01C 9/02 |
| 2021/0221247 A1 * | 7/2021 | Daniel .................... | B60L 55/00 |
| 2022/0140610 A1 * | 5/2022 | Bangalore ............... | H02J 3/322 |
| | | | 320/101 |

* cited by examiner

*Primary Examiner* — Yuhui R Pan
(74) *Attorney, Agent, or Firm* — Carr & Ferrell LLP; Myrna M. Schelling

(57) ABSTRACT

Systems and methods for interval energy disaggregation utilizing machine learning are provided. An example method includes obtaining and cleaning weather data and customer data, and based on the customer data, determining whether a structure utilizes solar energy. If the structure utilizes solar energy, the overall aggregate data is disaggregated by using and training a first machine learning model, to ultimately produce a predicted solar production. The predicted solar production is extracted from an overall aggregate data of the structure. Then, the method continues with disaggregating the non-solar aggregate data by utilizing at least a second ML model, to produce disaggregated data relating to at least one of AC energy consumption and EV (electric vehicle) consumption. The disaggregated data is provided to the customer or utility. The disaggregated data comprises at least one of the predicted solar production, the AC energy consumption, and the EV consumption of the structure.

24 Claims, 5 Drawing Sheets

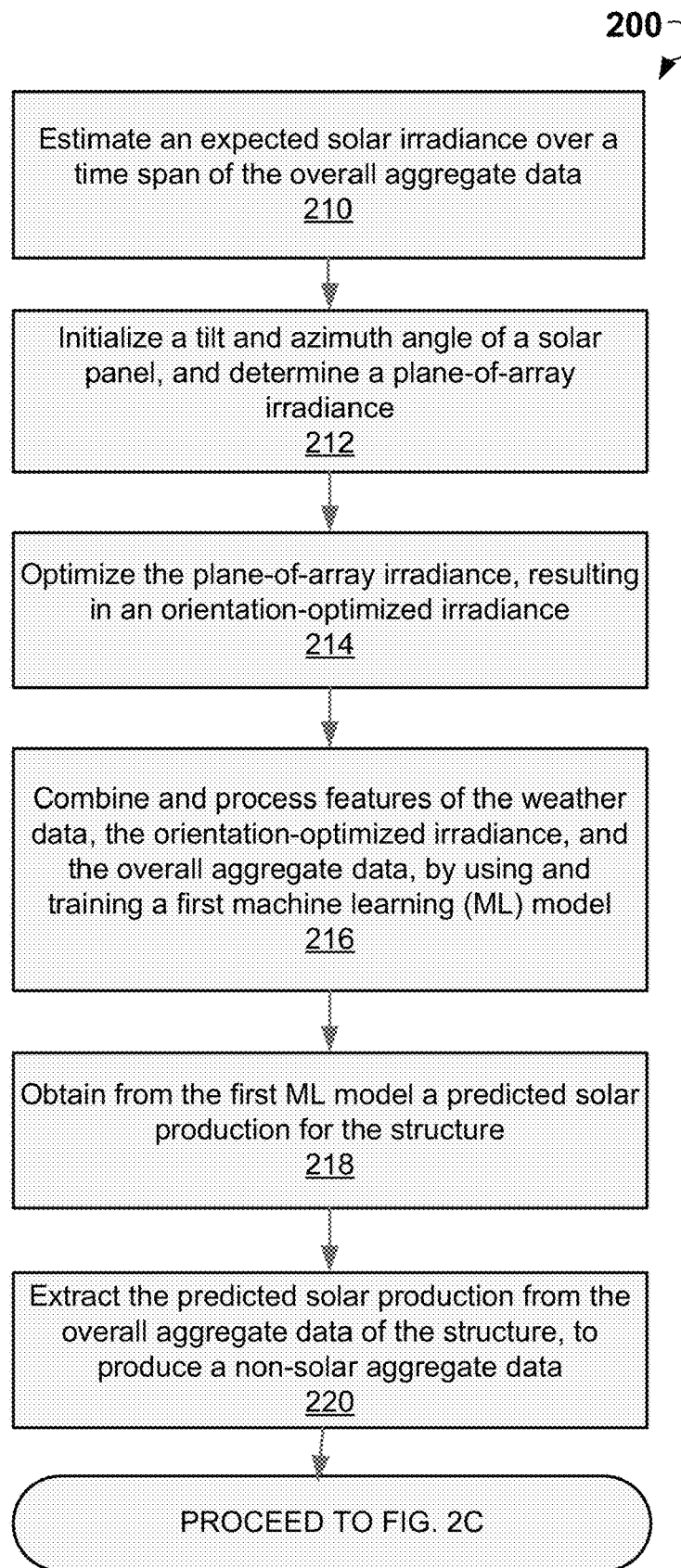

200

Estimate an expected solar irradiance over a time span of the overall aggregate data
210

Initialize a tilt and azimuth angle of a solar panel, and determine a plane-of-array irradiance
212

Optimize the plane-of-array irradiance, resulting in an orientation-optimized irradiance
214

Combine and process features of the weather data, the orientation-optimized irradiance, and the overall aggregate data, by using and training a first machine learning (ML) model
216

Obtain from the first ML model a predicted solar production for the structure
218

Extract the predicted solar production from the overall aggregate data of the structure, to produce a non-solar aggregate data
220

PROCEED TO FIG. 2C

*FIG. 2B*

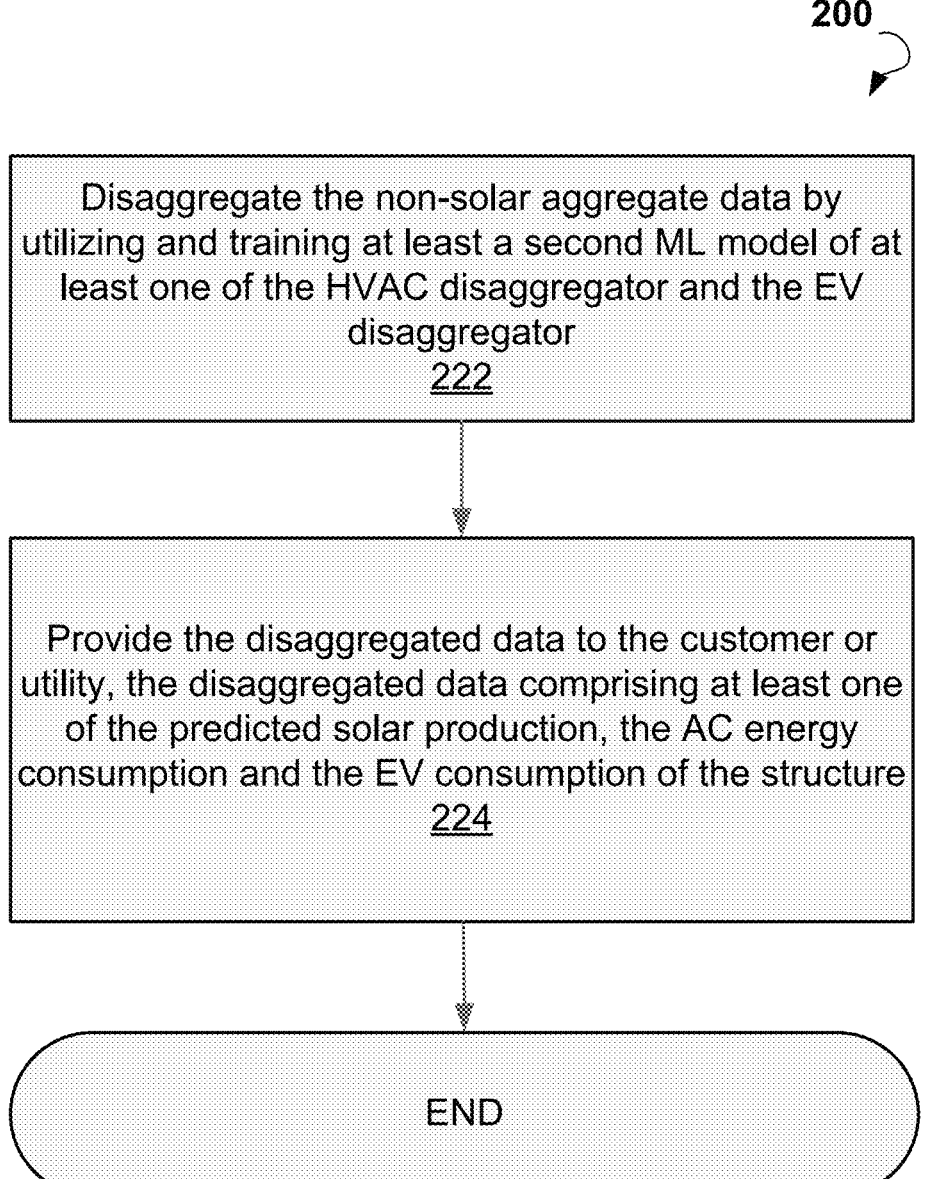

200

Disaggregate the non-solar aggregate data by utilizing and training at least a second ML model of at least one of the HVAC disaggregator and the EV disaggregator
222

Provide the disaggregated data to the customer or utility, the disaggregated data comprising at least one of the predicted solar production, the AC energy consumption and the EV consumption of the structure
224

END

310 — One or more Processors

320 — Memory

330 — Mass Storage

340 — Portable Storage

350 — One or more output devices

360 — One or more Input Devices

370 — Network Interface

380 — One or more Peripheral Devices

390

SYSTEMS AND METHODS FOR INTERVAL ENERGY DISAGGREGATION UTILIZING MACHINE LEARNING

CROSS REFERENCE TO RELATED APPLICATIONS

N/A.

TECHNICAL FIELD

The present disclosure relates generally to energy disaggregation and, more particularly, to systems and methods for interval energy disaggregation by utilizing machine learning.

BACKGROUND

Customarily, utility companies provide utility bills for the customers for payment of energy usage. Specifically, the utility bills indicate what is the total energy consumption of a customer's household for a given utility, whether it be gas, electricity, and the like, and the utility costs for the household's energy consumption. However, such traditional utility bills fail to provide a customer with the information that they require, in order for the customer to effectively manage or tailor their energy consumption to best suit their household's energy needs. Likewise, utility companies cannot presently obtain the consumption information of their customers which they require, in order to decide what approach best addresses the potential or current problems that may occur with their local grid.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are systems and methods for interval energy disaggregation utilizing machine learning. The use and training of one or more machine learning models are contemplated. An exemplary method for interval energy disaggregation begins with obtaining and cleaning weather data and customer data. The weather data pertains to weather conditions of a location of a structure, while the customer data pertains to a customer (or a user) associated with the structure. The customer data further comprises a geographic location of the structure and overall aggregate data generated by an advanced meter infrastructure of a utility. The overall aggregate data includes consumption data regarding energy usage of the customer at the structure.

Based on the customer data, a determination is made whether the structure utilizes solar energy. If it is determined that the structure utilizes solar energy, the overall aggregate data, as generated by the utility, is disaggregated by using and training a first machine learning (ML) model. The disaggregation of the overall aggregate data further includes optimizing a tilt and azimuth angle of a solar panel of the structure, resulting in an orientation-optimized irradiance; and combining and processing data features of the weather data, the orientation-optimized irradiance, and the overall aggregate data, by using and training the first ML model. An output of a predicted solar production is obtained for the structure. The predicted solar production, if any, is extracted or removed from the overall aggregate data of the structure, thereby resulting in non-solar aggregate data for the structure.

Then, based on the weather data and the customer data, the non-solar aggregate data is disaggregated by utilizing at least a second ML model, to produce disaggregated data relating to at least one of AC energy consumption and EV (electric vehicle) consumption. Finally, the disaggregated data is provided to the customer or utility. The disaggregated data includes at least one of the predicted solar production, the AC energy consumption, and the EV consumption of the structure.

Furthermore, an exemplary system for interval energy disaggregation utilizing machine learning is disclosed herein. The system includes a memory for storing executable instructions and a processor comprising a solar disaggregator, an HVAC disaggregator and an EV disaggregator. The processor is coupled to the memory, and the processor is configured to execute the executable instructions. The executable instructions include obtaining and cleaning weather data and customer data The weather data pertains to weather conditions of a location of a structure, while the customer data pertains to a customer (or a user) associated with the structure. The customer data further comprises a geographic location of the structure and overall aggregate data generated by an advanced meter infrastructure of a utility. The overall aggregate data includes consumption data regarding energy usage of the customer at the structure.

Based on the customer data, a determination is made whether the structure utilizes solar energy. If it is determined that the structure utilizes solar energy, the overall aggregate data, as generated by the utility, is disaggregated by using and training a first machine learning (ML) model of the solar disaggregator. The disaggregation of the overall aggregate data further includes optimizing a tilt and azimuth angle of a solar panel of the structure, resulting in an orientation-optimized irradiance; and combining and processing data features of the weather data, the orientation-optimized irradiance, and the overall aggregate data, by using and training the first ML model. An output from the first ML model in the form of a value for the predicted solar production is obtained for the structure. The predicted solar production, if any, is extracted or removed from the overall aggregate data of the structure, thereby resulting in non-solar aggregate data for the structure.

Then, based on the weather data and the customer data, the non-solar aggregate data is disaggregated by utilizing at least a second ML model of at least one of the HVAC disaggregator and the EV disaggregator, to produce disaggregated data relating to at least one of AC energy consumption and EV (electric vehicle) consumption. Finally, the disaggregated data is provided to the customer or utility. The disaggregated data includes at least one of the predicted solar production, the AC energy consumption, and the EV consumption of the structure.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements.

FIGS. 2A, 2B, and 2C are flow charts showing a method for interval energy disaggregation utilizing machine learning, according to an example embodiment.

DETAILED DESCRIPTION

Figure 1:
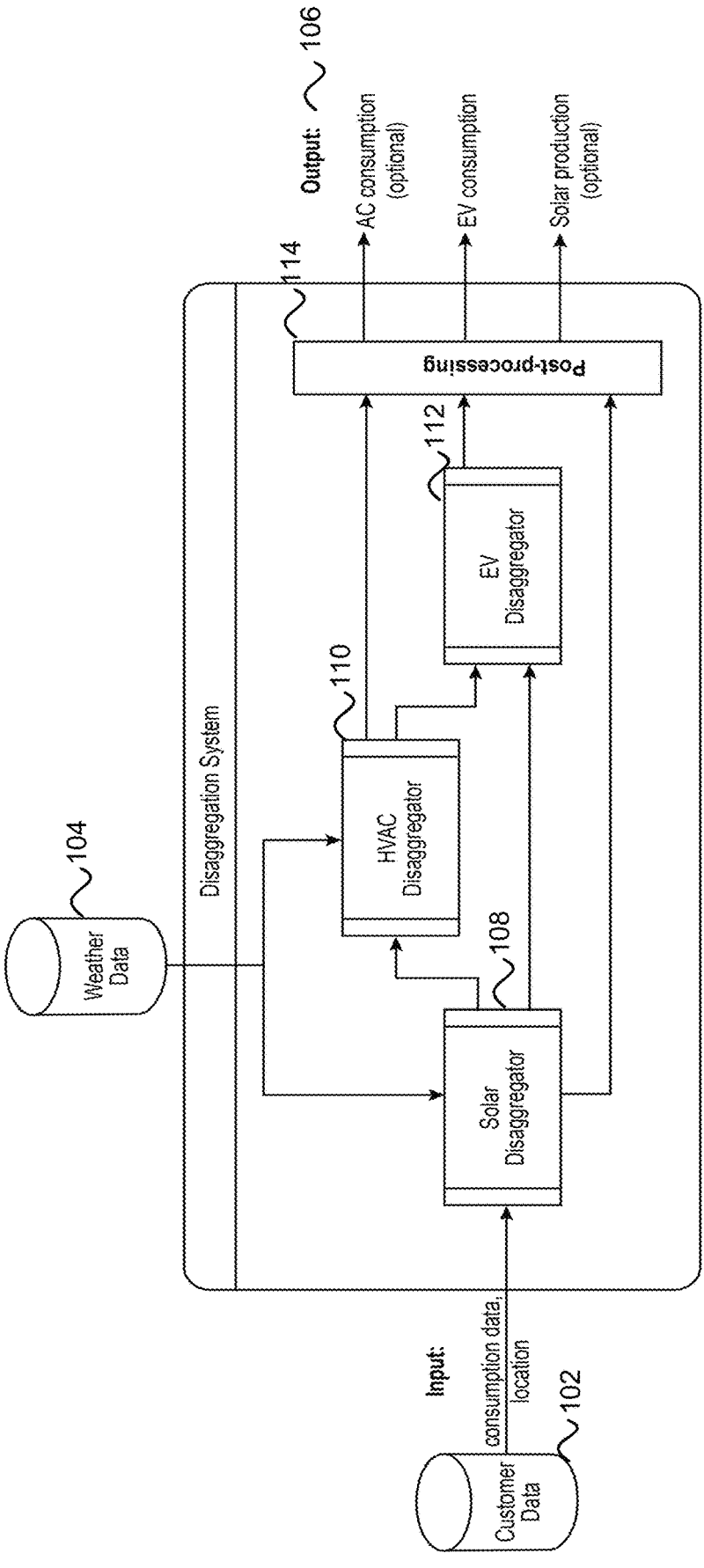
FIG. 1 is a block diagram of a system for interval energy disaggregation utilizing machine learning, according to some example embodiments.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In general, the present disclosure is related to systems and methods for interval energy disaggregation by utilizing machine learning. These systems and methods are designed to estimate appliance-level consumption from advanced metering infrastructure (AMI) data, which aggregates energy consumption over intervals (which may be intervals of any duration, including but not limited to 15-minute intervals, 30-minute intervals, and hourly intervals). In other words, the systems and methods for interval energy disaggregation utilize the AMI data that is already generated and furnished by the utility (using meter data primarily used for utility billing purposes), in order to derive as much useful information for as many parties as possible. Thus, the systems and methods provided herein do not require any additional software or hardware implementations (e.g., a smart meter) at the utility level. The present disclosure supports a number of loads, including but not limited to Electric Vehicles (EVs), heating (e.g., baseboard heaters, space heaters, electric central furnaces, heat pump systems, and the like), cooling (e.g., window cooling units, electric central systems, heat pump systems and the like), water heating (e.g., resistive and heat pump systems), solar generation, always-on/baseline consumption, and refrigeration (e.g., fridges, freezers, combined units and the like).

Embodiments of the present disclosure may provide technological solutions for providing useful insights about what specific loads are utilized in a given structure and how much energy is being delivered for those loads in the structure. The structure may be any type of construction, such as a house, a building, a condominium, an apartment building, and the like. The systems and methods described herein can cover any major load, and the techniques provided herein can be utilized for larger appliances, such as heating, cooling, hot water, and electric vehicles. As used herein, the term "local grid" may refer to an electrical network installed in a residential structure (such as a house), a commercial structure (such as a commercial building), or any other defined physical structure or boundary. With the machine learning and optimization techniques disclosed herein, such insights can be made regarding the energy usage of the larger appliances for the structure. These insights can provide helpful information to both the customer (also referred to as an "end user") whose household or structure is utilizing the energy resources, as well as to a given utility company supplying the energy resources to the structure.

The systems and methods described herein inform the customer what specifically in their structure/home is utilizing energy and how much energy is being delivered to meet the customer's needs that drive the rising costs of their utility bill. With this useful information provided by the present disclosure, the customer can become more aware of how much energy is being consumed by a given larger appliance and how to best tailor or manage their energy resources while still having the customer's energy consumption needs met. Also, with the data derived by the present disclosure, the customer can be furnished with recommendations regarding their energy resources. For example, based on the data provided by the present disclosure, a customer may be informed that their electrical heating unit is running often at night, and they can be provided a customized recommendation that with the installation of a smart meter, their electrical heating can be turned down at night while still meeting the customer's needs for a comfortable temperature throughout the night.

Also, the present disclosure provides useful data to a utility company that is interested in what customer loads are so that the utility company can then decide what are the best approaches to solve potential problems that may occur with their local grid. As an example, a transformer on a given street may be overloaded at certain times of a given day. With the present disclosure, the utility may determine that electric vehicles contribute to the overloading of the transformer based on the data provided by the systems and methods of interval energy disaggregation disclosed herein. As a result, the utility can decide what to deploy, in order to address the overload. For example, the utility may decide to shift the load and may also decide to provide energy-saving recommendations to their customers.

Furthermore, as electrification and penetration of renewables increase, utilities face infrastructure limitations and they encounter difficulty in anticipating and delivering generation capacity, as well as difficulties in grid planning due to a lack of transparency of these grid resources and the like. Understanding their customer's behaviors, as well as their load types and adoption trends, is of high importance to a utility for grid planning, program development, program monitoring, etc. A disaggregation system can be used for such a purpose, along with direct usage display and associated behavioral recommendations to the customer/end user.

FIG. 1 is a block diagram of a system 100 for interval energy disaggregation utilizing machine learning, according to some example embodiments. The system 100 includes a processor and a memory for storing executable instructions to perform one or more methods of interval energy disaggregation utilizing machine learning. Such methods will be described later herein, in the context of FIGS. 2A, 2B and 2C.

Returning to FIG. 1, the system 100 comprises a disaggregation system designed to input data (such as customer data 102 and weather data 104) and, utilizing one or more machine learning models, output 106 of at least one disaggregated data regarding AC energy consumption, EV consumption, and solar production. Further details about the system are set forth in Appendices A and B, which are incorporated by reference herein in their entireties.

The customer data 102 and weather data 104 may be obtained from any datastore or database. Typically, the customer data 102 and weather data 104 is derived from data generated and furnished by a utility company, a weather service, and/or the customer itself. The customer data 102 relates to a customer who is associated with or living in a structure (such as a homeowner or an apartment tenant). The customer data 102 includes data regarding the geographic location of the structure. The customer data 102 also includes the overall aggregate data that is generated by an advanced meter infrastructure (AMI) of a utility. The overall aggregate data includes the consumption data regarding energy usage of the customer at the structure, including but not limited to, electrical, gas, and solar energy usage.

The system 100 includes a solar disaggregator 108, an HVAC disaggregator 110, and an EV disaggregator 112. In exemplary embodiments, the operations of the solar disaggregator 108, the HVAC disaggregator 110, and the EV disaggregator 112 are performed by one or more processors coupled with one or more memories. In some embodiments, the operations of the solar disaggregator 108, the HVAC disaggregator 110, and the EV disaggregator 112 are performed using one or more machine learning models.

Based on features of the customer data 102 and weather data 104, the solar disaggregator 108 disaggregates the overall aggregate data by using and training a first machine learning (ML) model, in order to produce an output of predicted solar production. The solar disaggregator 108 is utilized if it is determined that a given structure utilizes solar energy. If it is determined that the structure does not utilize solar energy, then the solar disaggregator 108 does not perform its data processing function on the overall aggregate data for the given structure. More information about the solar disaggregator is provided later herein and in Appendices A and B, which are both incorporated by reference in their entireties.

Notably, the system 100 provides a hierarchical structure for the solar disaggregator 108, the HVAC disaggregator 110, and the EV disaggregator 112. Also, notably, the solar disaggregator 108, the HVAC disaggregator 110, and the EV disaggregator 112 are interdependent, they are coupled with one another, and they rely upon each other, as depicted in FIG. 1. There is also interactivity and feedback between the solar disaggregator 108, the HVAC disaggregator 110, and the EV disaggregator 112 in that the machine learning models associated with the solar disaggregator 108, the HVAC disaggregator 110, and the EV disaggregator 112 leverage the hierarchical structure of the system 100.

Specifically, if the structure relies on solar power, the output of a first ML model that is used to perform the operations of the solar disaggregator 108 is considered the predicted solar production of the structure. This predicted solar production is extracted from the overall aggregate data of the structure, resulting in a non-solar aggregate data of the structure. By using non-solar aggregate data for the machine learning models of the downstream disaggregators (namely, the HVAC disaggregator 110, and the EV disaggregator 112), the accuracy of the output 106 data results of the system 100 is dramatically increased. Stated another way, if the structure utilizes solar power, the input data (the non-solar aggregate data) which is provided to the HVAC disaggregator 110 and the EV disaggregator 112 will not include the inaccuracies that occur when solar energy production is still included in the overall aggregate data that is inputted to the HVAC disaggregator 110 and the EV disaggregator 112. The removal of the solar component from the overall aggregate data is desired, so that the customer's structure may be treated as if it were a non-solar structure and the resulting predictions (the outputs of the disaggregation system 100 in FIG. 1), can be more accurate.

It should also be noted that if the structure does not utilize solar power, the overall aggregate data is already considered non-solar aggregate data to be used as data inputs by the HVAC disaggregator 110, and the EV disaggregator 112.

Figure 2A:
Figure 2A:
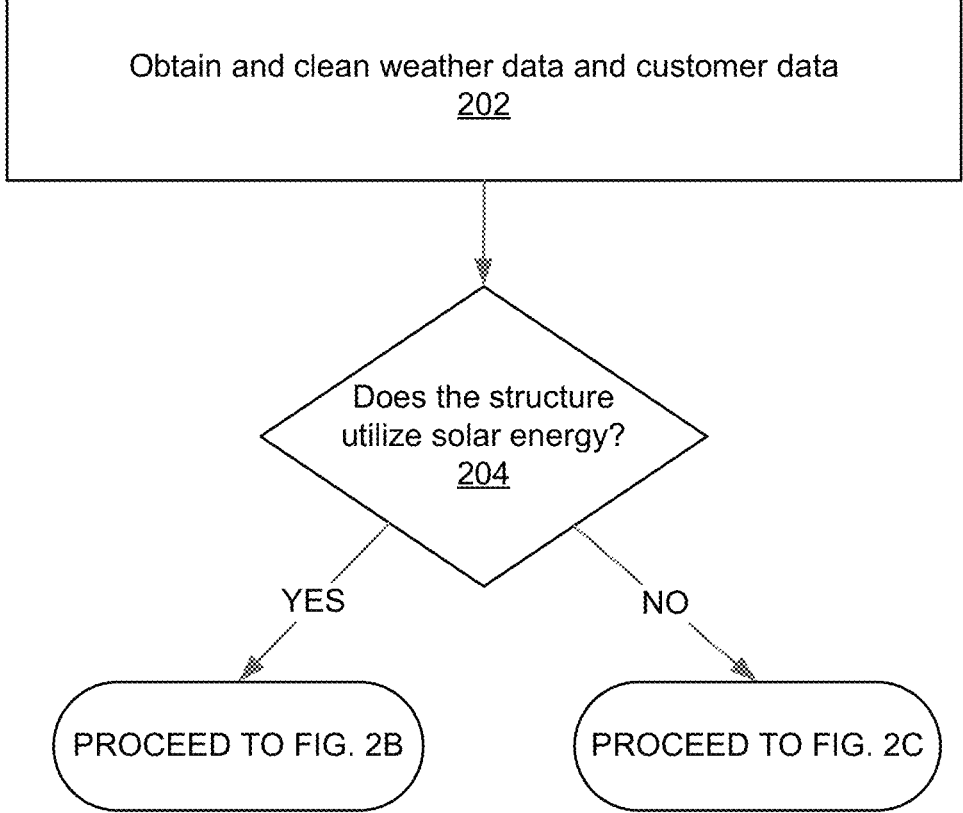

Turning now to FIGS. 2A-2C, these figures are flow charts showing a method 200 for interval energy disaggregation utilizing machine learning, according to an example embodiment. The method 200 can be performed by the system 100 described above with reference to FIG. 1.

The method 200 commences with block 202, where weather data and customer data are obtained from data sources. The weather and customer data are also cleaned. The weather data pertains to weather conditions of a location of a structure, while the customer data pertains to the customer associated with the structure. The customer data includes a geographic location of the structure and overall aggregate data generated by an advanced meter infrastructure of a utility. The overall aggregate data comprises consumption data regarding energy usage of the customer at the structure (also known as "household usage"). As shown on page 3 of Appendix B, the user data may include load data provided by the customer through a survey. The user data may also include feedback from the data and any data related to connected devices.

At block 204, a determination is made whether the structure utilizes solar power. This determination can be made based on the customer data. If it is determined that the structure utilizes solar power, then it is presumed that solar consumption data is still included in the overall aggregate data, and thus, the method 200 continues with the blocks provided in FIG. 2B. If at block 204 it is determined that the structure does not utilize solar power, then since solar consumption data is not a part of the overall aggregate data, the overall aggregate data is considered non-solar aggregate data, in which case the method 200 continues with the blocks as depicted in FIG. 2C.

If a determination is made at block 204 that the structure utilizes solar power, the method 200 continues with FIG. 2B, where the disaggregation of the overall aggregate data that is generated by the utility begins. By using and training a first machine learning (ML) model, the solar disaggregation of the overall aggregate data is accomplished by the solar disaggregator 108. Weather features are obtained based on the structure's general location.

At block 210, an expected solar irradiance is estimated over a time span ($t_0$:t) of the overall aggregate data of the structure. At block 212, a tilt $\alpha$ and azimuth angle $\theta$ of a solar panel of the structure are initialized, and a plane-of-array irradiance based on the location of the structure is determined. The location may include latitude and longitude coordinates of the structure. Specifically, the expected plane-of-array irradiance, $\hat{I}$, is computed for the customer's general latitude and longitude, $(l_{lat}, l_{lon})$, assuming the given solar tilt and azimuth angle, i.e., $$\hat{I}(t_0{:}t) = POA(\alpha, \theta, l_{lat}, l_{lon}, t_0{:}t).$$

At block 214, the tilt and azimuth angle of the solar panel are optimized, resulting in an orientation-optimized irradiance. Specifically, for the day, $t_d$, in the aggregate data showing the largest total solar generation (i.e., the sunniest day relative to household usage), the solar panel tilt and azimuth angle are optimized by recomputing and scaling the expected irradiance and minimizing (in the least squares sense) the difference between the re-scaled irradiance, $\underline{\hat{I}}(t_d)$, and the household usage (given by $x(t_d)$) during daytime hours. In other words:

$$\text{minimize}_{(\alpha, \theta \in \mathbb{R})}(\underline{\hat{I}}(t_d) - |x(t_d)|)^2 \text{ subject to } \begin{cases} 0 \le \alpha \le 90 \\ 0 \le \theta \le 360 \end{cases}, \text{ where}$$

$$\underline{\hat{I}}(t_d) = \hat{I}(t_d) \cdot \frac{\min(x(t_d))}{\max(\hat{I}(t_d))}$$

At a high level, for solar disaggregation, based on the customer's general location, (provided in longitude and latitude coordinates), the expected irradiance at that specific location may be determined, which can be used with historical overall aggregate data. The solar disaggregation continues with an extra optimization step, where, in view of the aggregate consumption data, the solar panel tilt and the solar panel angle are tweaked or adjusted to decide what best matches the aggregated data with the expected irradiance. The first ML model then takes that optimized irradiance output value for a given interval (an interval that is generally between 15-60 minutes) with the overall aggregate data and various statistical features of the aggregate data including but not limited to the rolling hourly variance, the rolling hourly median, the rolling hourly min and max consumption, total daily kWh of net negative consumption, etc. Briefly, the first ML model (denoted f), of arbitrary form and parameterized by an n-dimensional vector, $\theta$, is trained using ground truth solar production data (denoted by y), associated household usage data (denoted by x), and various predictive inputs such as that described above for orientation-optimized irradiance, weather features, and statistical features of the aggregate data (combined and denoted by the matrix X), according to the following:

$$\theta^* \leftarrow \text{minimize}_{\theta \in \mathbb{R}^n} C(f(\theta, x, X), y),$$

where C is an arbitrary cost function defining the penalization of various prediction errors made by the model (i.e., comparing $\hat{y} = f(\theta, x, X)$ with y), a simple example of which might be the mean squared error. The minimization of the cost function is itself arbitrary but may involve a process such as stochastic gradient descent and may further involve monitoring errors on a random testing subset of the available input data. The parameters of the model satisfying the local minimum in the cost function according to the selected optimization process (denoted by $\theta^*$ above) constitute a trained ML model and can be used with unseen consumption data (along with orientation-optimized irradiance, weather and extracted statistical features) to predict the interval solar generation.

Turning back to FIG. 2B, at block 216, the combination and processing of data features of the weather data, the orientation-optimized irradiance, and the overall aggregate data are performed, by using and training the first ML model as described above. At block 218, an output in the form of a predicted solar production of the solar panel(s) of the structure is obtained from the first ML model. Further details regarding solar disaggregation are provided in pages 3-6 of Appendix A, which is incorporated by reference herein in its entirety.

At this point, at block 220, the predicted solar production, if any, is extracted from the overall aggregate data of the structure, thereby resulting in non-solar aggregate data for the structure. Then, as shown in FIG. 2C, the method 200 continues at block 222 with disaggregating the non-solar aggregate data, based on the weather data and the customer data. The disaggregation may include utilizing at least a second ML model and possibly a third model, to produce disaggregated data relating to at least one of AC energy consumption and EV (electric vehicle) consumption.

For AC energy consumption, the HVAC disaggregation of the overall aggregate data is accomplished by the HVAC disaggregator 110 by using and training the second ML model. For HVAC disaggregation, where possible given sufficient historical data, the cooling and heating onset temperature is estimated for a given customer, so that the same ML model can be used to generate predictions of AC energy consumption, regardless of the temperature at which a home (structure)/user may respond to external temperature extremes. The process for this is as follows:

1. Initialize a cooling and heating onset temperature, e.g., $T_{c_c} = 20°$ C. and $T_{h_c} = 20°$ C., respectively.
2. Fit a polynomial relationship in daily consumption, $y_{home}$, to external temperature, T, on either side of the onset temperatures, as well as between the onset temperatures (i.e., in the comfortable temperature range), rejecting outliers defined by a variance cut-off with respect to the initialized fit.
3. Simultaneously minimize the residual sum of squares between each polynomial relationship and the daily consumption in the temperature region by optimizing the onset temperatures.

Although higher degree relationships are contemplated with the present disclosure, an example of this process is shown below for the case where the polynomial relationship is degree 1 (i.e., a linear relationship):

$$\hat{y}_{home}(T_{h_c}, T_{c_c}) = \begin{cases} m_h T + b_h, & T > T_{h_c} \\ b_n, & T_{c_c} \le T \le T_{h_c} \\ m_c T + b_c, & T < T_{c_c} \end{cases}$$

$$\text{minimize}_{(T_{h_c}, T_{c_c} \in \mathbb{R})}(\hat{y}_{home} - y_{home})^2 \text{ subject to } \begin{cases} m_c, b_h, b_c, b_n \ge 0 \\ m_h \le 0 \\ T_{h_c} < T_{c_c} \end{cases}$$

Notably, in the context of HVAC disaggregation, post-processing may be performed. Under the assumption that the dependency of daily consumption on temperature should be dominated by heating/cooling appliances, relationships as described above may be determined to provide a default daily HVAC consumption value (to be distributed across hours in the day in proportion to the relative household consumption in that hour), which is used when the prediction confidence of a second ML model (denoted model g) is low.

These onset temperatures are then used to classify each day as either cooling, heating, or neither. A separate ML model is trained to predict cooling and heating based on combined weather features as well as a set of 279 aggregate features, for example auto-correlation coefficients, measures of entropy, trend values, etc. In a similar way, the second ML model (denoted g), of arbitrary form and parameterized by an m-dimensional vector, $\varphi$, is trained using ground truth AC energy consumption data (denoted by y), associated household usage data (denoted by x), and various predictive inputs such as weather features and the statistical features mentioned above (combined and denoted by the matrix X), according to the following:

$$\varphi * \leftarrow \text{minimize}_{\varphi \in \mathbb{R}^m} C\left(g(\varphi, x, X), y \mid T \geq T_{c_c}\right),$$

where C is an arbitrary cost function defining the penalization of various prediction errors made by the model (i.e. comparing $\hat{y}=g(\varphi, x, X)$ with y). The parameters of the model satisfying the local minimum in the cost function according to the selected optimization process (denoted by $\varphi^*$ above) constitute a trained ML model and can be used with unseen consumption data (along with weather and extracted statistical features) to predict the interval AC energy consumption. Further details regarding HVAC disaggregation are provided in pages 6-8 of Appendix A, which is incorporated by reference herein in its entirety.

Furthermore, still referring to block 222 of FIG. 2C, for EV (electric vehicle) energy consumption, the EV disaggregation of the overall aggregate data is accomplished by the EV disaggregator 112 (FIG. 1) by using and training utilizing at least a second ML model. For EV disaggregation, leveraged features of EV consumption patterns may include but are not limited to the large magnitude, consistency, and duration of EV-related loads relative to other household loads There are three main tiers of EV chargers of concern.
1. Level 1 chargers (L1 hereafter): 12-15 A @ 120 V, ~1.4-1.8 kW
2. Level 2 chargers (small, L2S hereafter): 15-20 A @ 240 V, ~3.6-4.8 kW
3. Level 2 chargers (large, L2L hereafter): 24+ A @ 240 V, ~5.8+ kW Note that these current limits can be imposed by the EV supply equipment (EVSE, the charger), or by the EV itself (called the power acceptance, related to the onboard AC-DC converter). The premise of EV detection may be summarized as follows:

Where inferred HVAC permits, check that the aggregate consumption exceeds that expected by each given tier of L2L, L2S, and L1 consumption ranges for a minimum duration consistent with the charging rate (e.g., for 15 minute interval data: L2L≥30 minutes, L2S≥1 hour, L1≥6 hours) given baseline household usage. These cut-offs are somewhat arbitrary, but are chosen to maximize capture of battery EV and large capacity plug-in hybrid EV charging sessions, while minimizing false positive risk at the given data resolution. If potential EV charging is detected with reasonable confidence and regularity, the power level of the EVSE is re-estimated using the detected sessions.

The steps of EV disaggregation are as follows:

1. Determine the baseline usage for the structure. Baseline usage is what is meant by (in the preceding paragraph) "check that the aggregate consumption exceeds that expected by each given tier . . . given baseline household usage": The threshold for EV detection should include the baseline aggregate consumption, which can be large for some structures. For example, if a structure has always-on loads constituting an estimated 1 kWh of energy at each 15-minute interval, the consumption that might be inferred to be an EV to be contributing to the aggregate consumption should be approximately 1 kWh higher. This baseline usage can depend on the season, the day of the week, the hour of the day, etc. For this reason, the baseline usage is modeled as sinusoidal, and optimized in the least-squares sense the phase and amplitude in weekly blocks to local minima (of order 3) in the aggregate consumption signal. This baseline usage is then incremented by a large fraction of the expected consumption value of the EV tier of interest (e.g., 80% of 0.95 kWh per 15 minute interval for L2S), which is then used as the threshold for EV detection.
2. Determine the aggregate regions exceeding that threshold subject to the duration conditions described above. Satisfactory aggregate regions are qualified as candidates for an EV charging session.

Furthermore, post-processing may occur to correct any overlap across the inferred consumption for the main tiers of EV chargers previously discussed. Furthermore, techniques of confidence prediction and a binary check may be instrumental for post-processing of EV disaggregation. With confidence prediction, for each week of aggregate data, a set of descriptive statistics is generated. For example, these descriptive features may include the inter-quartile range of household usage over the week, the baseline consumption, the proportion of time spent over the EV detection threshold described above, the degree of correlation of consumption with external temperature, etc. In a similar fashion as that described for both solar and AC disaggregation, a third ML model (denoted h) of arbitrary form and parameterized by an r-dimensional vector, $\phi$, is trained to output an expected relative over-prediction error of inferred EV charging using ground truth EV over-prediction error (denoted $\tilde{e}$, this error is determined by comparing known EV charging (denoted by y) with disaggregated EV charging (denoted by $\hat{y}$) using the EV disaggregation method described to this point but not further. In other words, $$\tilde{e} = \frac{\hat{y} - y}{y},$$

where $\hat{y} \geq y > 0$). The model h uses the known over-prediction error, $\tilde{e}$, the household or structure consumption data (denoted by x), and the descriptive features of the household usage data as described above (combined and denoted by the matrix X), and is trained according to the following:

$$\phi * \leftarrow \text{minimize}_{\phi \in \mathbb{R}^r} C\left(h(\phi, x, X), \tilde{e}\right),$$

where C is an arbitrary cost function defining the penalization of various prediction errors made by the model (i.e. comparing $\hat{\tilde{e}}=h(\phi, x, X)$ with $\tilde{e}$). The parameters of the model satisfying the local minimum in the cost function according to the selected optimization process (denoted by $\phi^*$ above)

constitute a trained ML model and can be used with unseen consumption data (along with weather and extracted statistical features) to anticipate the over-prediction error on unseen data (and thereby estimate confidence). In other words, the set of descriptive statistics is passed to a trained ML model trained on those features, and the ML model outputs an expected over-prediction error. When the expected over-prediction error for a given week exceeds a given threshold or tolerance, that week of aggregate data is discarded. Then, the median predicted EV consumption is carried forward to those discarded weeks of aggregate data.

This ML model was developed using synthetically generated EV charging behaviours, injected into a large variety of aggregate data conditions. Then, a discard will be done of the weeks for which the predicted error exceeds some tolerance. Depending on the binary check described below, carry forward the median weekly predicted EV consumption to the discarded weeks.

A binary check is for determining whether an EV charger is present or not in the historical data provided. A binary check is useful both as an independent output as well as to inform the inferred consumption values. In the process of confidence prediction described above, the remaining data after discarding weeks with low confidence is used to enforce a minimum and maximum number of monthly inferred charge sessions. Any inferred EV consumption is zeroed if this check fails, and any discarded weeks have the median weekly EV consumption imputed if this check succeeds. The assumption here is that if there is sufficient confidence in inferring EV consumption in some minimum duration of historical data, the EV charging is treated as approximately behaviorally constant over weekly scales.

Hence, for EV disaggregation, a threshold for EV detection includes a baseline aggregate usage of the structure. Also, for EV disaggregation, techniques of confidence prediction and a binary check (as described above) may be applied. Further details regarding EV disaggregation are provided in pages 8-12 of Appendix A, which is incorporated by reference herein in its entirety.

As mentioned earlier, the solar disaggregator 108, the HVAC disaggregator 110, and the EV disaggregator 112 of the system 100 (FIG. 1) are interdependent and related to each other. An example of this interdependency is demonstrated in EV disaggregation. Specifically, the inferred HVAC contribution to the overall aggregate data (of household usage) is passed or otherwise transmitted to the EV disaggregator. This may be seen as a feedback loop, such that the system 100 (FIG. 1) trains and learns based on the hierarchical structure. The inferred HVAC contribution to the overall aggregate data is used in the following way to post-process inferred EV charging sessions:

a. For inferred EV sessions, check whether the inferred HVAC over the duration compensates for an appreciable fraction of the energy consumed during that interval.

b. The "appreciable fraction" is determined as a likelihood cutoff for the residual between real household usage and ground truth HVAC usage for a large number of structures.

c. In other words, when the residual between the aggregate consumption and inferred HVAC consumption during an inferred EV session is large compared to what has been seen in real datasets, it is likely that the EV session is correct, and that the inferred HVAC should be adjusted to accommodate that session.

Several other aspects of the present disclosure benefit from iterative feedback loops, particularly as the amount of historical data grows. One such aspect is the iterative estimation of the baseline consumption of the structure, which is used to provide more accurate estimates of EV charging sessions as well as the power draw of any EV chargers present. Another aspect is the estimation of heating and cooling onset temperatures, as well as in the optimization of solar panel orientation if applicable. As additional data becomes available, the system will converge to stable estimates of these and other quantities.

The systems and methods described herein may further benefit from the feedback of known charging patterns given user connectivity in the form of communicating EV supply equipment or communicating EVs. Despite EV disaggregation being unnecessary for these users, the associated ground truth EV charging data can be used with the inferred EV charging activity to provide ongoing training for the confidence model h to be applied globally across users.

The invention may further benefit from the feedback of approximated HVAC operating state for users with communicating thermostat systems. This can be used to directly inform the AC disaggregation and therefore have direct improvements on the EV disaggregation process.

Finally, at block 224, the disaggregated data is provided to the customer or utility. The disaggregated data includes at least one or more of the predicted solar production, the AC energy consumption, and the EV consumption of the structure. The disaggregated data may be displayed on a display of a computing device of the customer or utility.

Figure 3:
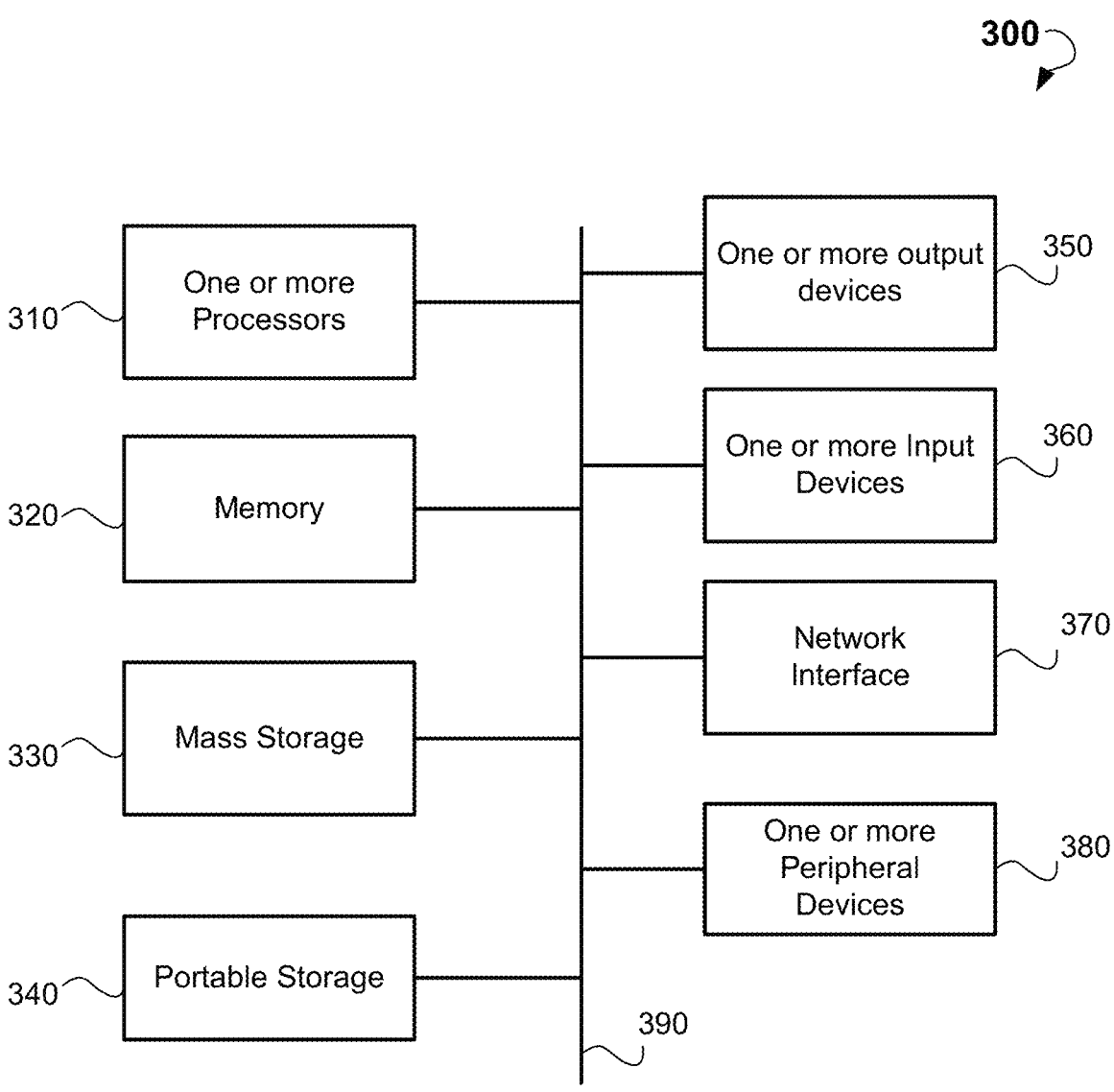
FIG. 3 shows a computing system suitable for implementing embodiments of the present disclosure.

FIG. 3 illustrates an exemplary computing system 300 that can be used to implement embodiments described herein. The computing system 300 can be implemented in the context of the disaggregation system 100 (FIG. 1). The exemplary computing system 300 of FIG. 3 may include one or more processors 310 and memory 320. Memory 320 may store, in part, instructions and data for execution by the one or more processors 310. Memory 320 can store the executable code when the exemplary computing system 300 is in operation. The exemplary computing system 300 of FIG. 3 may further include a mass storage 330, portable storage 340, one or more output devices 350, one or more input devices 360, a network interface 370, and one or more peripheral devices 380.

The components shown in FIG. 3 are depicted as being connected via a single bus 390. The components may be connected through one or more data transport means. The one or more processors 310 and memory 320 may be connected via a local microprocessor bus, and the mass storage 330, one or more peripheral devices 380, portable storage 340, and network interface 370 may be connected via one or more input/output buses.

Mass storage 330, which may be implemented with a magnetic disk drive or an optical disk drive, is a non-volatile storage device for storing data and instructions for use by a magnetic disk or an optical disk drive, which in turn may be used by one or more processors 310. Mass storage 330 can store the system software for implementing embodiments described herein for purposes of loading that software into memory 320.

Portable storage 340 may operate in conjunction with a portable non-volatile storage medium, such as a compact disk (CD) or digital video disc (DVD), to input and output data and code to and from the computing system 300 of FIG. 3. The system software for implementing embodiments described herein may be stored on such a portable medium and input to the computing system 300 via the portable storage 340.

One or more input devices 360 provide a portion of a user interface. The one or more input devices 360 may include an alphanumeric keypad, such as a keyboard, for inputting alphanumeric and other information, or a pointing device, such as a mouse, a trackball, a stylus, or cursor direction keys. Additionally, the computing system 300 as shown in FIG. 3 includes one or more output devices 350. Suitable one or more output devices 350 include speakers, printers, network interfaces, and monitors.

Network interface 370 can be utilized to communicate with external devices, external computing devices, servers, and networked systems via one or more communications networks such as one or more wired, wireless, or optical networks including, for example, the Internet, intranet, LAN, WAN, cellular phone networks (e.g., Global System for Mobile communications network, packet switching communications network, circuit switching communications network), Bluetooth radio, and an IEEE 802.11-based radio frequency network, among others. Network interface 370 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a Universal Serial Bus.

One or more peripheral devices 380 may include any type of computer support device to add additional functionality to the computing system. The one or more peripheral devices 380 may include a modem or a router.

The components contained in the exemplary computing system 300 of FIG. 3 are those typically found in computing systems that may be suitable for use with embodiments described herein and are intended to represent a broad category of such computer components that are well known in the art. Thus, the exemplary computing system 300 of FIG. 3 can be a personal computer, handheld computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a central processing unit (CPU) for execution. Such media can take many forms, including, but not limited to, non-volatile media, volatile media, and transmission media. Non-volatile media include, for example, optical or magnetic disks, such as a fixed disk. Volatile media include dynamic memory, such as RAM. Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Thus, systems and methods for interval energy disaggregation utilizing machine learning are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A method for interval energy disaggregation utilizing machine learning, the method comprising:

obtaining and cleaning weather data and customer data, the weather data pertaining to weather conditions of a location of a structure, the customer data pertaining to a customer associated with the structure, the customer data further comprising a geographic location of the structure and overall aggregate data generated by an advanced meter infrastructure of a utility, the overall aggregate data comprising consumption data regarding energy usage of the customer at the structure;

based on the customer data, determining whether the structure utilizes solar energy;

upon a determination that the structure utilizes solar energy, disaggregating the overall aggregate data generated by the utility by using and training a first machine learning (ML) model for solar disaggregation, the disaggregating further comprising:

initializing a tilt and azimuth angle of a solar panel of the structure;

optimizing the tilt and azimuth angle of the solar panel, resulting in an orientation-optimized irradiance;

combining and processing data features of the weather data, the orientation-optimized irradiance, and the overall aggregate data, by using and training the first ML model; and obtaining from the first ML model an output of a predicted solar production for the structure;

extracting the predicted solar production, if any, from the overall aggregate data of the structure, thereby resulting in non-solar aggregate data for the structure;

based on the weather data and the customer data, disaggregating the non-solar aggregate data by utilizing at least a second ML model of at least one of HVAC disaggregation and EV disaggregation, to produce disaggregated data relating to at least one of AC energy consumption and EV (electric vehicle) consumption, respectively; and providing the disaggregated data to the customer or the utility, the disaggregated data comprising at least one of the predicted solar production, the AC energy consumption, and the EV consumption of the structure.

2. The method of claim 1, wherein upon a determination that the structure utilizes solar energy, disaggregating the overall aggregate data further comprises:

estimating an expected solar irradiance over a time span $(t_0{:}t)$ of the overall aggregate data; and determining a plane-of-array irradiance based on the location of the structure, the location including latitude and longitude coordinates.

3. The method of claim 1, wherein obtaining and cleaning weather data and customer data further comprises:

validating the customer data and the weather data; and merging and synchronizing data sources.

4. The method of claim 1, further comprising performing post-processing of the disaggregated data.

5. The method of claim 1, wherein the overall aggregate data includes data regarding energy usage of the customer at the structure based on time intervals, each time interval lasting approximately 15 minutes to 60 minutes.

6. The method of claim 2, wherein optimizing the plane-of-array irradiance, resulting in the orientation-optimized irradiance further comprises optimizing the tilt and the azimuth angle of the solar panel of the structure, by recomputing and re-scaling the expected solar irradiance and minimizing a difference between the re-scaled irradiance and a solar consumption signal of the structure during daytime hours.

7. The method of claim 1, wherein for the EV disaggregation, the method further comprises applying a confidence prediction and a binary check.

8. The method of claim 7, wherein for the EV disaggregation, the confidence prediction comprises:

generating a set of descriptive statistics for each week of aggregate data, the descriptive statistics including at least two of an inter-quartile range of household usage over the week, a baseline EV consumption, and a degree of correlation of EV consumption with external temperature; and based on the set of descriptive statistics, providing an output of an expected over-prediction error by a machine learning model.

9. The method of claim 1, wherein for the EV disaggregation, a threshold for EV detection includes a baseline aggregate usage of the structure.

10. The method of claim 7, wherein for the EV disaggregation, when a binary check succeeds, a median weekly EV consumption is imputed for one or more weeks in which aggregate data was discarded.

11. The method of claim 1, wherein for the HVAC disaggregation, historical AC energy consumption data is utilized to estimate a cooling and heating onset temperature for the customer.

12. The method of claim 4, wherein performing post-processing of the disaggregated data further comprises performing post-processing of inferred EV charging sessions by passing the AC energy consumption to the EV disaggregator in a feedback loop.

13. A system for interval energy disaggregation utilizing machine learning, the system comprising:

a memory for storing executable instructions; and a processor comprising a solar disaggregator, an HVAC disaggregator and an EV disaggregator, the processor coupled to the memory, the processor configured to execute the executable instructions to:

obtain and clean weather data and customer data, the weather data pertaining to weather conditions of a location of a structure, the customer data pertaining to a customer associated with the structure, the customer data further comprising a geographic location of the structure and overall aggregate data generated by an advanced meter infrastructure of a utility, the overall aggregate data comprising consumption data regarding energy usage of the customer at the structure;

based on the customer data, determine whether the structure utilizes solar energy;

upon a determination that the structure utilizes solar energy, disaggregate the overall aggregate data generated by the utility by using and training a first machine learning (ML) model of the solar disaggregator, the disaggregating further comprising:

initializing a tilt and the azimuth angle of a solar panel of the structure;

optimizing the tilt and azimuth angle of the solar panel, resulting in an orientation-optimized irradiance;

combining and processing data features of the weather data, the orientation-optimized irradiance, and the overall aggregate data, by using and training the first ML model; and obtaining from the first ML model an output of a predicted solar production for the structure;

extract the predicted solar production, if any, from the overall aggregate data of the structure, thereby resulting in non-solar aggregate data for the structure;

based on the weather data and the customer data, disaggregate the non-solar aggregate data by using and training at least a second ML model of at least one of the HVAC disaggregator and the EV disaggregator, to produce disaggregated data relating to at least one of AC energy consumption and EV (electric vehicle) consumption, respectively; and providing the disaggregated data to the customer or the utility, the disaggregated data comprising at least one of the predicted solar production, the AC energy consumption, and the EV consumption of the structure.

14. The system of claim 13, wherein upon a determination that the structure utilizes solar energy, disaggregating the overall aggregate data further comprises:

estimating an expected solar irradiance over a time span $(t_0{:}t)$ of the overall aggregate data; and determining a plane-of-array irradiance based on the location of the structure, the location including latitude and longitude coordinates.

15. The system of claim 13, wherein obtaining and cleaning weather data and customer data further comprises:

validating the customer data and the weather data; and merging and synchronizing data sources.

16. The system of claim 13, further comprising performing post-processing of the disaggregated data.

17. The system of claim 13, wherein the overall aggregate data includes data regarding energy usage of the customer at the structure based on time intervals, each time interval lasting approximately 15 minutes to 60 minutes.

18. The system of claim 14, wherein optimizing the plane-of-array irradiance, resulting in the orientation-optimized irradiance further comprises optimizing the tilt and the azimuth angle of the solar panel of the structure, by recomputing and re-scaling the expected solar irradiance and minimizing a difference between the re-scaled irradiance and a solar consumption signal of the structure during daytime hours.

19. The system of claim 13, wherein for the EV disaggregation, the method further comprising applying a confidence prediction and a binary check.

20. The system of claim 19, wherein for the EV disaggregation, the confidence prediction comprises:

generating a set of descriptive statistics for each week of aggregate data, the descriptive statistics including at least two of an inter-quartile range of household usage over the week, a baseline EV consumption, and a degree of correlation of EV consumption with external temperature; and based on the set of descriptive statistics, providing an output of an expected over-prediction error by a machine learning model.

21. The system of claim 13, wherein for the EV disaggregation, a threshold for EV detection includes a baseline aggregate usage of the structure.

22. The system of claim 19, wherein for the EV disaggregation, when a binary check succeeds, a median weekly EV consumption is imputed for one or more weeks in which aggregate data was discarded.

23. The system of claim 16, wherein performing the post-processing of the disaggregated data further comprises performing the post-processing of inferred EV charging sessions by passing the AC energy consumption to the EV disaggregator in a feedback loop.

24. A non-transitory computer readable medium for having embodied thereon instructions, which when executed by a processor, perform steps of a method for interval energy disaggregation utilizing machine learning, the method comprising:

obtaining and cleaning weather data and customer data, the weather data pertaining to weather conditions of a location of a structure, the customer data pertaining to a customer associated with the structure, the customer data further comprising a geographic location of the structure and overall aggregate data generated by an advanced meter infrastructure of a utility, the overall aggregate data comprising consumption data regarding energy usage of the customer at the structure;

based on the customer data, determining whether the structure utilizes solar energy;

upon a determination that the structure utilizes solar energy, disaggregating the overall aggregate data generated by the utility by using and training a first machine learning (ML) model for solar disaggregation, the disaggregating further comprising:

initializing a tilt and azimuth angle of a solar panel of the structure;

optimizing the tilt and azimuth angle of the solar panel, resulting in an orientation-optimized irradiance;

combining and processing data features of the weather data, the orientation-optimized irradiance, and the overall aggregate data, by using and training the first ML model; and obtaining from the first ML model an output of a predicted solar production for the structure;

extracting the predicted solar production, if any, from the overall aggregate data of the structure, thereby resulting in non-solar aggregate data for the structure;

based on the weather data and the customer data, disaggregating the non-solar aggregate data by utilizing at least a second ML model of at least one of HVAC disaggregation and EV disaggregation, to produce disaggregated data relating to at least one of AC energy consumption and EV (electric vehicle) consumption, respectively; and providing the disaggregated data to the customer or the utility, the disaggregated data comprising at least one of the predicted solar production, the AC energy consumption, and the EV consumption of the structure.

\* \* \* \* \*